United States Patent
Chung et al.

(10) Patent No.: US 6,672,985 B2
(45) Date of Patent: Jan. 6, 2004

(54) INDEPENDENTLY ROTATING WHEELS WITH PLANETARY DRIVE

(75) Inventors: I-Chao Chung, Troy, MI (US); Leonard R. Elliott, Macomb, MI (US); Michael E. Johnson, Rochester, MI (US)

(73) Assignee: AxleTech International IP Holdings, LLC, Troy, MI (US)

( * ) Notice: Subject to any disclaimer, the term of this patent is extended or adjusted under 35 U.S.C. 154(b) by 0 days.

(21) Appl. No.: 09/943,015

(22) Filed: Aug. 30, 2001

(65) Prior Publication Data

US 2003/0045390 A1 Mar. 6, 2003

(51) Int. Cl.[7] .............................................. F16H 48/06
(52) U.S. Cl. ..................... 475/221; 180/24.03; 180/372
(58) Field of Search ................................ 475/221, 230, 475/243; 180/372, 24.03

(56) References Cited

U.S. PATENT DOCUMENTS

| | | | |
|---|---|---|---|
| 1,207,658 A | 12/1916 | Swain | |
| 1,481,405 A | 1/1924 | Anglada | |
| 1,540,526 A | 6/1925 | Anglada | |
| 1,543,044 A | 6/1925 | Anglada | |
| 1,809,699 A | 6/1931 | Higbee | |
| 1,914,266 A | 6/1933 | Leupold | |
| 1,919,925 A | 7/1933 | Blakeslee | |
| 1,975,206 A | 10/1934 | Fuhrman | |
| 1,979,598 A | 11/1934 | Ash | |
| 1,994,719 A | 3/1935 | Lichty | |
| 2,001,875 A | 5/1935 | Higbee | |
| 2,030,548 A | 2/1936 | Smeets | |
| 2,082,001 A | 6/1937 | Hanson | |
| 2,082,292 A | 6/1937 | Kendall | |
| 2,126,960 A | 8/1938 | Higbee | |
| 2,132,029 A | 10/1938 | Higbee | |
| 2,135,568 A | 11/1938 | Durham et al. | |
| 2,136,125 A | 11/1938 | Devlaval-Crow | 308/236 |
| 2,142,787 A | 1/1939 | Higbee | 180/22 |
| 2,154,497 A | 4/1939 | Durham | 188/18 |
| 2,182,560 A | 12/1939 | Higbee | 280/96.1 |
| 2,192,023 A | 2/1940 | Ash | |
| 2,206,216 A | 7/1940 | Ash | 280/96.1 |
| 2,210,572 A | 8/1940 | Durham | 188/22 |
| 2,213,473 A | 9/1940 | Peterman | |
| 2,214,457 A | 10/1940 | Fuhrman | |
| 2,239,674 A | 4/1941 | Frederickson | 188/22 |
| 2,242,454 A | 5/1941 | Cochran | |
| 2,243,181 A | 5/1941 | Altemus | |
| 2,252,205 A | 8/1941 | Reynolds | 180/22 |
| 2,260,828 A | 10/1941 | Burger | |
| 2,264,785 A * | 12/1941 | Ash | 180/24 |
| 2,267,362 A | 12/1941 | Ash | |
| 2,270,918 A | 1/1942 | Ash | 301/13 |
| 2,298,333 A | 10/1942 | Ash et al. | 301/5 |

(List continued on next page.)

FOREIGN PATENT DOCUMENTS

| | | |
|---|---|---|
| DE | 3811398 | 4/1988 |
| DE | 42 17 260 A1 | 12/1993 |
| DE | 43 22 517 | 2/1994 |
| FR | 2203324 | 4/1974 |
| GB | 502313 | 3/1939 |
| GB | 515057 | 11/1939 |

*Primary Examiner*—Rodney H Bonck
*Assistant Examiner*—David D. Le
(74) *Attorney, Agent, or Firm*—Howard & Howard

(57) ABSTRACT

A wheel end assembly having a dual wheel configuration includes independently rotating wheel hubs to reduce tire wear. The wheel end includes a first planetary gear assembly with a sun gear driven by a differential side gear and a ring gear for driving one wheel hub. A second planetary gear assembly with a sun gear driven by a differential side gear and a ring gear drives another wheel hub. A differential assembly is coupled to the first and second sun gears to allow the first and second wheel hubs to rotate relative to one another as the vehicle executes turning maneuvers.

21 Claims, 4 Drawing Sheets

U.S. PATENT DOCUMENTS

| | | | |
|---|---|---|---|
| 2,298,334 A | 10/1942 | Ash | |
| 2,303,599 A | 12/1942 | Ash | 301/6 |
| 2,305,836 A | 12/1942 | Ash | |
| 2,343,129 A | 2/1944 | Ash | 301/36 |
| 2,353,730 A | 7/1944 | Joy | 180/66 |
| 2,357,343 A | 9/1944 | Morgan | 180/22 |
| 2,386,917 A | 10/1945 | Thornton | |
| 2,389,339 A | 11/1945 | Ash | |
| 2,397,673 A | 4/1946 | Lewis | |
| 2,398,348 A | 4/1946 | Ash | |
| 2,441,807 A | 5/1948 | Francis | 280/124 |
| 2,459,347 A | 1/1949 | Tolman | |
| 2,462,574 A | 2/1949 | Wallace | |
| 2,482,824 A | 9/1949 | Alden | 301/36 |
| 2,569,861 A | 2/1951 | Moore et al. | 301/36 |
| 2,576,258 A | 11/1951 | Marsh | 301/36 |
| 2,589,863 A | 3/1952 | Quartullo | |
| 2,727,582 A | 12/1955 | Lisenby | |
| 2,748,879 A | 6/1956 | Bailey | 180/24 |
| 2,773,723 A | 12/1956 | Randall | |
| 2,905,505 A | 9/1959 | Delker et al. | |
| 2,935,278 A | 5/1960 | Lesley | |
| 2,988,400 A | 6/1961 | Ash | 301/36 |
| 3,027,959 A | 4/1962 | Mailliard | |
| 3,161,083 A | 12/1964 | Roe | |
| 3,534,825 A | 10/1970 | Reffle | |
| 3,770,074 A | 11/1973 | Sherman | |
| 3,971,606 A | 7/1976 | Nakano et al. | 308/238 |
| 4,077,279 A * | 3/1978 | Goscenski, Jr. | 475/231 |
| 4,089,384 A | 5/1978 | Ehrenberg | |
| 4,138,168 A | 1/1979 | Wade | 308/189 R |
| 4,469,369 A | 9/1984 | Belik et al. | |
| 4,658,189 A | 4/1987 | Trusock | |
| 4,799,564 A | 1/1989 | Iijima et al. | 180/65.5 |
| 5,056,871 A * | 10/1991 | Sbarro | 301/36.1 |
| 5,058,016 A | 10/1991 | Davidovitch | 364/424.01 |
| 5,258,912 A | 11/1993 | Ghoneim et al. | 364/424.05 |
| 5,290,069 A | 3/1994 | Kallenberger | 384/129 |
| 5,624,004 A | 4/1997 | Watanabe | 180/168 |
| 5,887,983 A | 3/1999 | Gulian et al. | 384/296 |
| 5,894,902 A | 4/1999 | Cho | 180/65.5 |
| 5,971,413 A | 10/1999 | El-Kassouf | 280/124.111 |
| 5,971,621 A | 10/1999 | Oyafuso et al. | 384/539 |
| 6,145,611 A | 11/2000 | Haddad, Sr. | |
| 6,206,798 B1 | 3/2001 | Johnson | |
| 6,254,193 B1 | 7/2001 | Bowman et al. | |
| 6,267,188 B1 | 7/2001 | Bowman et al. | |
| 6,298,932 B1 | 10/2001 | Bowman | |
| 6,345,868 B1 | 2/2002 | Bowman et al. | 301/36.2 |
| 6,419,325 B1 * | 7/2002 | Bowman et al. | 301/36.1 |
| 6,471,301 B1 | 10/2002 | Johnson | 301/36.2 |
| 6,527,073 B1 | 3/2003 | Bowman et al. | 180/24.03 |

* cited by examiner

INDEPENDENTLY ROTATING WHEELS WITH PLANETARY DRIVE

BACKGROUND OF THE INVENTION

This invention relates to an axle assembly having dual wheels at each end of the axle in which one wheel on one axle end is permitted to rotate relative to another wheel on the same axle end. More specifically, the invention relates to a planetary drive with a differential supported between adjacent wheel hubs to achieve independent relative rotation during turns.

Drive axle assemblies have incorporated dual wheels on either end of the axle to increase the load bearing capability for heavy-duty vehicles. Typically the pair of wheels on each end of the axle assembly is secured together so that they rotate together at the same speed about an axis even during turns. Most off-highway vehicles, such as lift trucks, container handlers, front end loaders, etc., have duty cycles that include numerous turning maneuvers, which cause significant tire wear. Tire wear is a direct result of tire scrub, or drag, caused by wheels that are rigidly secured together for rotation at the same speed but which must travel different distances at the inside and outside of the turning radius. Tire wear and maintenance on heavy-duty off-highway vehicles due to scrub cost thousands of dollars annually per vehicle.

Additionally, tire scrub reduces vehicle stability during turning maneuvers. As a vehicle moves through a turn, tire scrub detracts from the net ground coefficient necessary for traction, braking, and side forces in turns. Tire scrub also causes premature wear of various wheel end components, such as wheel rims. The wheel rims can fail prematurely due to added stresses caused by repeated tire scrub. Finally, tire scrub increases fuel consumption and powertrain wear and tear.

For the above reasons, it would be desirable to reduce tire scrub by having a wheel end that allows adjacent wheel hubs to rotate independently relative to one other to allow each tire to rotate at different speeds through a turn.

SUMMARY OF THE INVENTION

A wheel end assembly having a dual wheel configuration includes independently rotating wheel hubs to reduce tire wear. In a disclosed embodiment of this invention, the wheel end includes a spindle and an axle shaft mounted for rotation relative to the spindle to define an axis of rotation. The wheel end further includes at least two wheel hubs supported for rotation about the axis. A planetary drive assembly drives the hubs to provide independent relative rotation. The planetary drive assembly includes an input member that is driven by the axle shaft and has a first output coupled to the first wheel hub and a second output coupled to the second wheel hub. A differential assembly drives the input member to achieve rotational speed differentiation.

In the preferred embodiment, the input member of the planetary drive assembly includes first and second sun gears driven by the differential assembly. The first output includes a first ring gear coupled to the first wheel hub and the second output includes a second ring gear coupled to the second wheel hub. A first set of planet gears are in meshing engagement with the first sun gear and the first ring gear and a second set of planet gears are in meshing engagement with the second sun gear and the second ring gear. The planet gears are supported on planet shafts that are fixed to the spindle.

In the preferred embodiment, the differential assembly includes side gears, differential pinions, and a differential spider. The spider is splined to and driven by the axle shaft. The differential pinions provide equal drive torque from the spider to the side gears. One side gear is mounted for rotation with the first sun gear and another side gear is mounted for rotation with the second sun gear. The differential pinions is are meshing engagement with the side gears to allow rotational speed differential between the first and second wheel hubs.

The subject invention offers a simple and compact design for independently rotating wheel hubs that significantly reduces tire wear resulting in less vehicle down time and which decreases overall maintenance cost. Further, because tire scrub is eliminated vehicle stability is improved and fuel economy is improved. These and other features of the present invention can be best understood from the following specifications and drawings, the following of which is a brief description.

DETAILED DESCRIPTION OF A PREFERRED EMBODIMENT

Figure 1A:
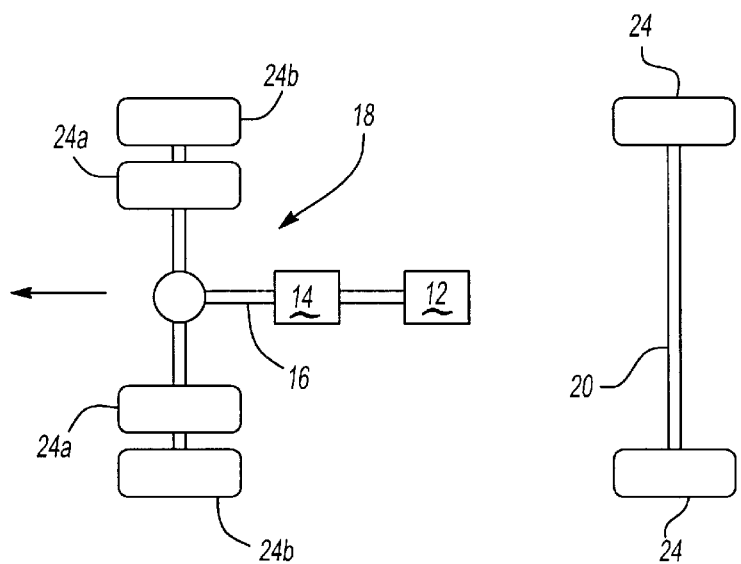
FIG. 1A is a schematic view of a typical off-highway vehicle powertrain.
Figure 1B:
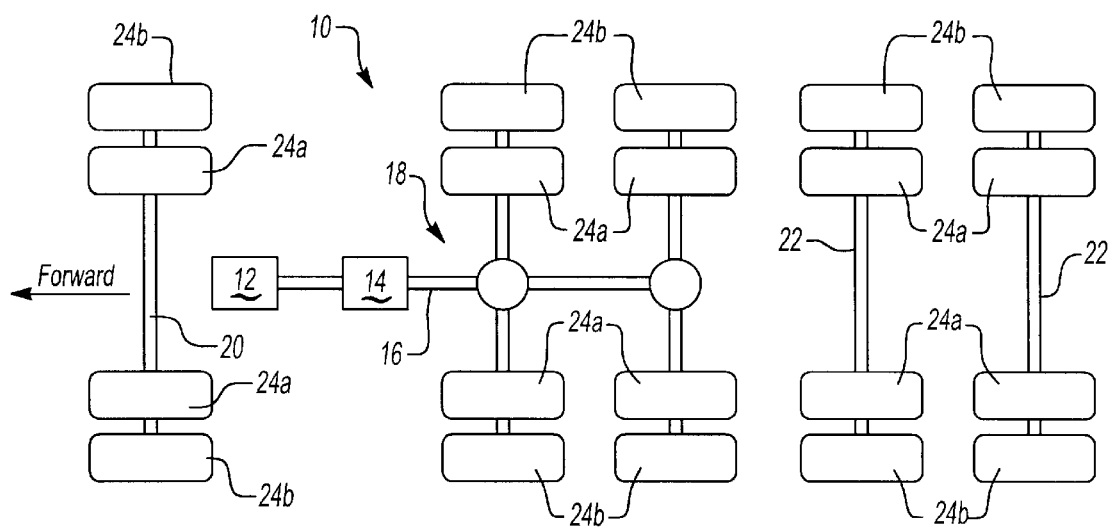
FIG. 1B is a schematic view of a typical on-highway vehicle powertrain.

FIG. 1A shows an overhead schematic view of a typical vehicle driveline 10 for a heavy-duty off-highway vehicle. FIG. 1B shows a typical on-highway vehicle driveline 110. The drivelines 10, 110 include an engine 12 coupled to a transmission 14, which together provide driving input torque to a drive shaft 16 that extends to a drive axle 18. The drive axle 18 can be a single drive axle or a tandem drive axle. The vehicle also typically includes non-driving axles such as a non-drive steer axle 20 and in the on-highway configuration, trailer axles 22.

Typically each drive axle 18 includes a wheel end assembly with dual wheels 24a, 24b on either end of the respective axle to increase the load bearing capability for the heavy-duty vehicle. As the vehicle maneuvers through a turn, the outer wheel 24b on the wheel end on the outside of the turn has a greater distance to travel than the inner wheel 24a. Conversely, on the inside of the turn, the inner wheel 24a travels farther than the outer wheel 24b. Typically, the dual wheels are rigidly connected to each other so that each wheel 24a, 24b rotates at the same speed through the turn. This causes tire scrub, which results in premature tire wear and wheel end component wear.

The subject invention allows each of the wheels 24a, 24b to provide drive torque on the drive axles 18 and to rotate independently from each other so that tire scrub is eliminated during turning operations. It should be understood that this invention can be used in any type of drive axle that incorporates dual wheels and that while the invention is especially useful in a heavy-duty off-highway vehicle application as shown in FIG. 1A, the invention can also be used in an on-highway configuration shown in FIG. 1B. A preferred application is a heavy-duty lift truck that utilizes a single front drive axle 18 as shown in FIG. 1A with dual wheels 24a, 24b on each end.

Figure 2:
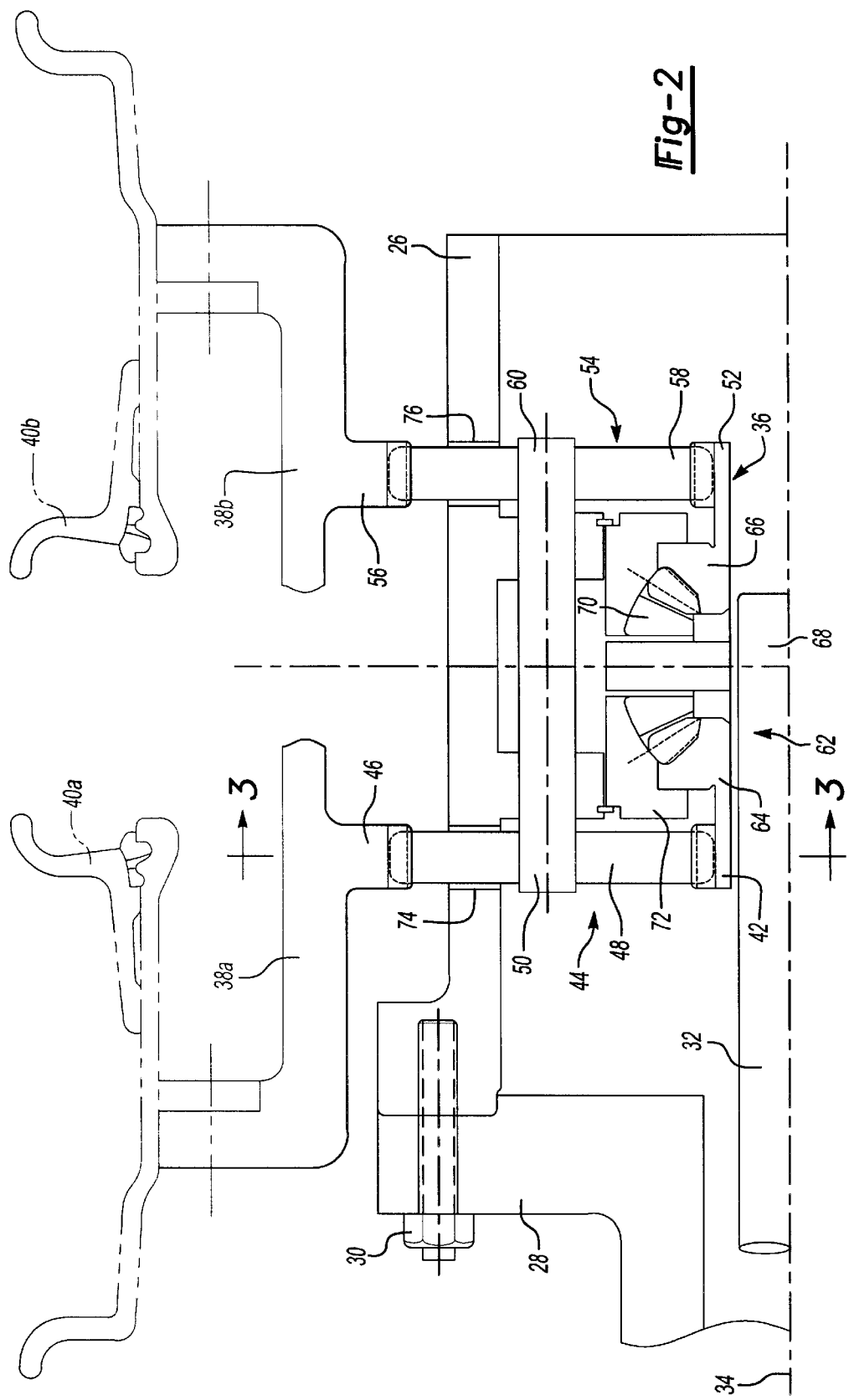
FIG. 2 is a cross-sectional view of a top half of one embodiment of a wheel end assembly incorporating the subject invention.

A wheel end assembly is shown in FIG. 2. The wheel end includes a non-rotating spindle 26 that is joined to an axle housing 28 with a plurality of fasteners 30 (only one is shown). While fasteners are preferred other known joining methods can also be used. An axle shaft 32 rotates due to driving input from the drive shaft 16 to define an axis of rotation 34.

A planetary drive assembly, shown generally at 36 provides output to at least two (2) wheel hubs 38a, 38b to permit the hubs 38a, 38b to rotate relative to one another as the vehicle executes turning maneuvers. The wheels 24a, 24b are mounted to the wheel hubs 38a, 38b with rims 40a, 40b.

Figure 3:
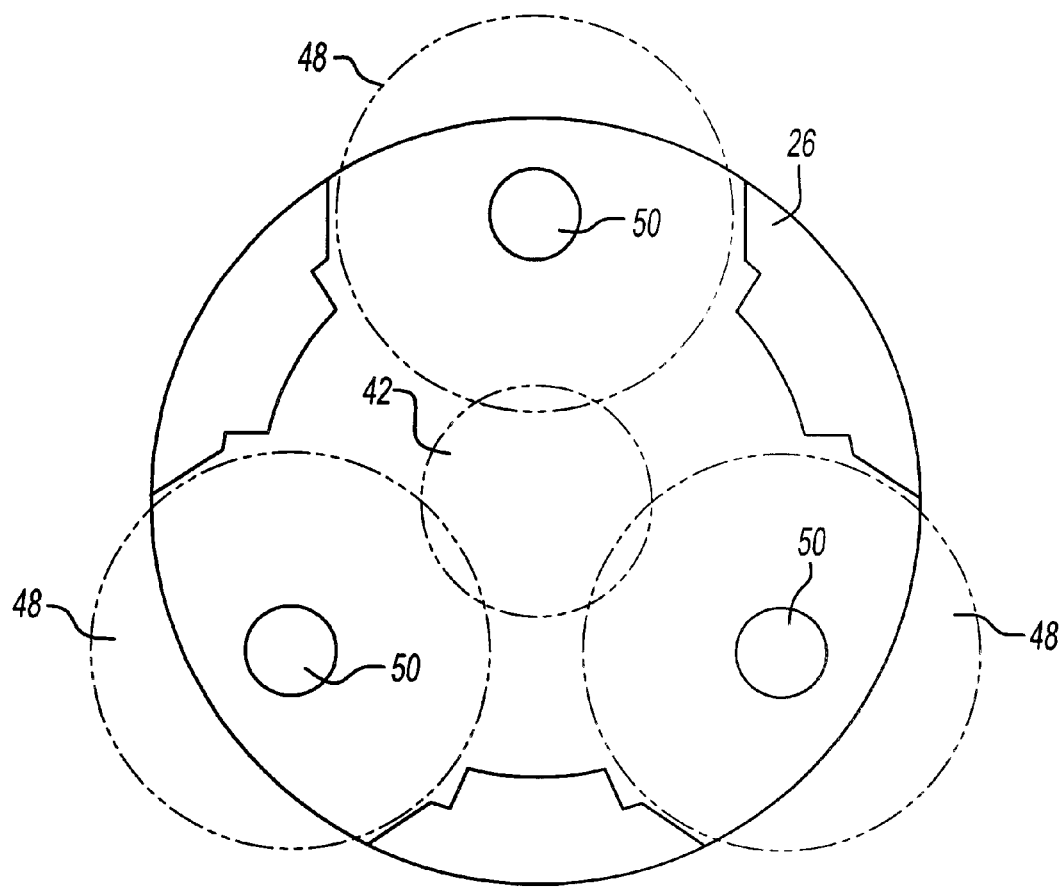
FIG. 3 is a cross-sectional view taken along lines 3—3 of FIG. 2.

The planetary drive assembly 36 includes a first sun gear 42, a first planetary gear set 44, and a first ring gear 46. The planetary gear set 44 includes a plurality of planet gears 48 that are mounted on planet shafts 50. Typically, a planetary gear set 44 includes three to four planet gears 48, see FIG. 3, however other planet gear configurations could also be used. The planet gears 48 are in meshing engagement with the first sun gear 42 and the first ring gear 46.

The planetary drive assembly 36 also includes a second sun gear 52, a second planetary gear set 54, and a second ring gear 56. The planetary gear set 54 includes a plurality of planet gears 58 that are mounted on planet shafts 60. The planet gears 58 are in meshing engagement with the second sun gear 52 and the second ring gear 56.

The planet shafts 50, 60 are fixed to the spindle 26 and are therefore non-rotating components. The planet gears 48, 58 do not rotate about the axis of rotation 34 but instead rotate about axes defined by planet shafts 50, 60. The sun gears 42, 52 provide the rotational input and the rotational output is provided by the ring gears 46, 56. Preferably one planet gear 48 from the first set is mounted on the same planet shaft as one planet gear 58 from the second set. In this configuration the planet shafts 50, 60 would be the same component. However, the planet shafts 50, 60 could also be separate components, and not necessarily share common axes.

A differential assembly 62 is positioned between the sun gears 42, 52 of each of the planetary drive assemblies 36. Any type of differential device can be installed between the sun gears 42, 52 such as a limited-slip-differential, No-Spin®, or Torsen®, for example. In the preferred embodiment, the differential assembly 62 includes at least a first side gear 64, a second side gear 66, a differential spider 68, differential pinions 70, and a differential case 72. The differential spider 68 is splined to and driven by the axle shaft 32. The differential pinions 70 provide equal drive torque from spider 68 to the side gears 64, 66. The side gears 64, 66 are mounted for rotation with the respective sun gears 42, 52 and are in meshing engagement with the differential pinions 70. The sun gears 42, 52 can be integrally formed with their respective side gears 64, 66 as one piece, or can be separate gear components. The differential pinions 70 are supported by the spider 68 which is typically mounted within the case 72. The operation of the differential gear assembly is well known and thus will not be discussed in further detail.

The spindle 26 includes a first set of slots 74 and a second set of slots 76. The first set of planet gears 48 and the second set of planet gears 58, respectively, extend through the first 74 and second 76 sets of slots. The slots 74, 76 should be wide enough to allow relatively free rotation of the planet gears 48, 58 relative to the spindle 26.

The operation of the planetary drive assembly 36 is as follows. The sun gears 42, 52 are driven by the differential side gears 64, 66 causing the sun gears 42, 52 and differential side gears 64, 66 to rotate about the axis of rotation 34 at different speeds if necessary. The sun gears 42, 52 drive their respective planet gear sets 44, 54 that in turn drive the respective ring gears 46, 56. The first ring gear 46 drives the first hub 38a and the second ring gear 56 drives the second hub 38b. The ring gears 46, 56 can be integrally formed with their respective hubs 38a, 38b as one piece or can be separate components coupled to each other. The planetary drive 36 with the differential assembly 62 allows each planetary drive assembly to rotate at different speeds allowing wheel hubs 38a, 38b to rotate relative to one another as the vehicle turns.

This planetary drive is a unique configuration. Standard planetary wheel ends have a fixed ring gear where the sun gear provides the input and the planet gears provide the output. In this configuration the planet gears are fixed and the ring gear provides the output. This configuration allows for the incorporation of a differential assembly to allow independent hub 38a, 38b rotation.

Figure 4:
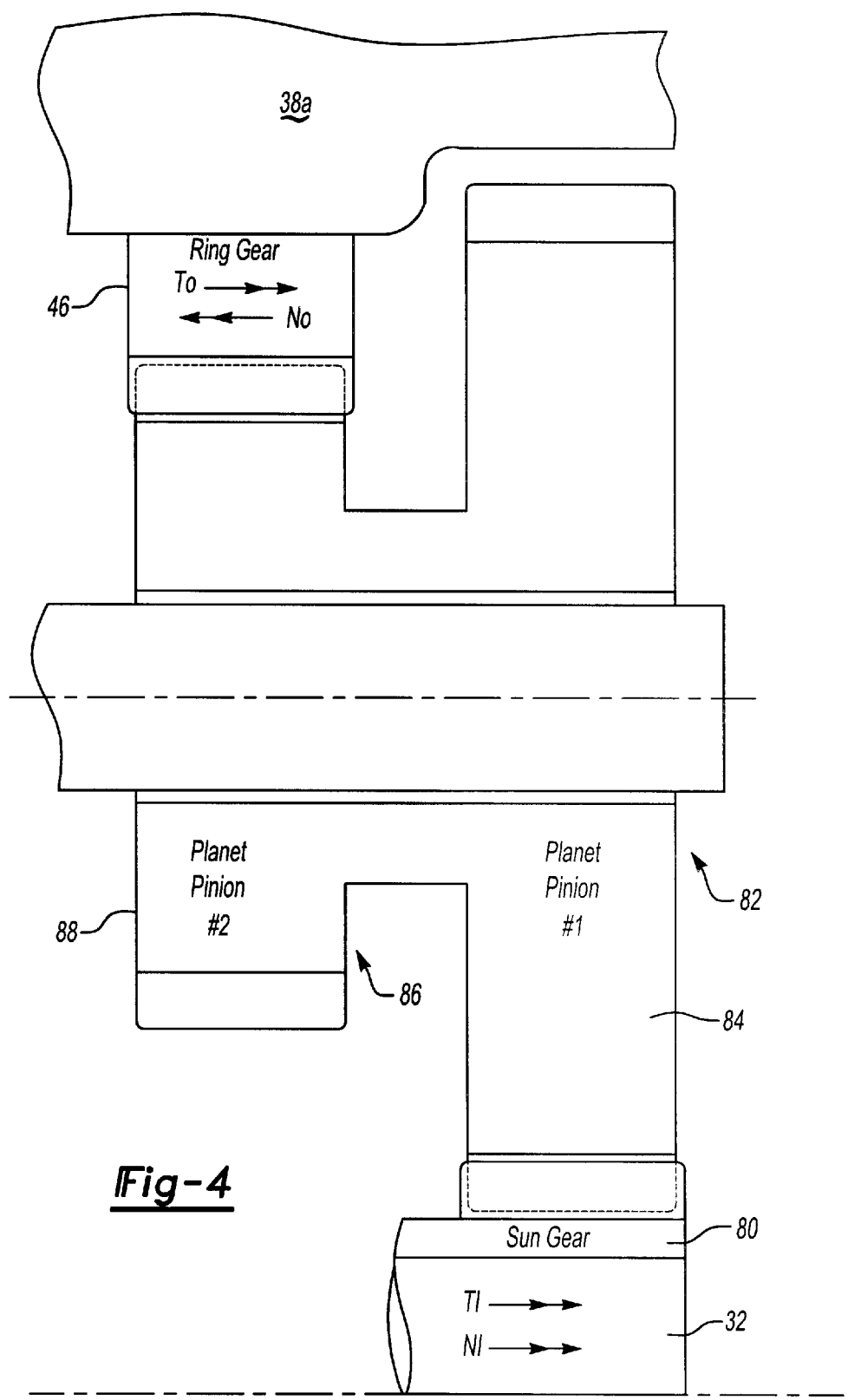
FIG. 4 is a cross-sectional view of a top half of an alternate embodiment of a planetary drive assembly incorporating the subject invention.

An alternate embodiment for the planetary drive assembly is shown in FIG. 4. In this configuration, the differential side gear 64 drives a sun gear 80 to provide input to a first planetary gear set 82. The planetary gear set 82 includes a plurality of planet gears 84 and operations similar to the sets 44, 54 in first configuration. A second planetary gear set 86 includes a second plurality of planet gears 88. The first and second sets 82, 86 are coupled together to provide for a higher overall ratio. The planet gears 88 from the second set 86 are in meshing engagement with the ring gear 46. This configuration shows the alternate drive for only one wheel hub 38a and it is understood that the same type of drive is used for the other wheel hub 38b.

The subject invention provides a dual wheel end assembly with independently rotating wheel hubs that greatly reduces tire wear, increase fuel economy, improves vehicle stability, and reduces premature wheel component wear.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A wheel end apparatus comprising:
   a spindle;
   an axle shaft mounted for rotation relative to said spindle and defining an axis of rotation;
   a first wheel hub supported for rotation about said axis;
   a second wheel hub positioned adjacent to said first wheel hub and supported for rotation about said axis; and
   a planetary drive assembly including an input member having at least one sun gear receiving driving input from said axle shaft and further including a first output and a second output with each of said outputs having at least one ring gear with said first output coupled to said first wheel hub and said second output coupled to said second wheel hub such that said first and second wheel hubs rotate relative to one another under predetermined conditions.

2. An apparatus as set forth in claim 1 including an axle housing joined to said spindle.

3. An apparatus as set forth in claim 1 wherein said input member is in direct driving engagement with said axle shaft.

4. An apparatus as set forth in claim 1 wherein said first output is independent from said second output.

5. An apparatus as set forth in claim 1 wherein said input member includes first and second sun gears driven by a differential assembly and said first output includes a first ring gear coupled to said first wheel hub and said second output includes a second ring gear coupled to said second wheel hub.

6. An apparatus as set forth in claim 5 wherein said first ring gear and said first wheel hub are integrally formed as one piece and said second ring gear and said second wheel hub are integrally formed as one piece.

7. An apparatus as set forth in claim 5 including a first planetary gear set in meshing engagement with said first sun gear and said first ring gear and a second planetary gear set in meshing engagement with said second sun gear and said second ling gear wherein said first and second planetary gear sets include a plurality of planet gears supported on planet shafts.

8. An apparatus as set forth in claim 7 wherein said planet shafts are fixed to said spindle.

9. An apparatus as set forth in 7 wherein said spindle includes a first set of slots through which said first planetary gear set extends and a second set of slots through which said second planetary gear set extends wherein said first and second sets of slots are wider than said first and second planetary gear sets to permit said planet gears to rotate freely relative to said spindle.

10. An apparatus as set forth in claim 7 wherein said differential assembly is driven by said axle shaft to drive first and second sun gears.

11. An apparatus as set forth in claim 10 wherein said differential assembly is positioned between said first and second sun gears.

12. An apparatus as set forth in claim 10 wherein said differential assembly includes a first differential side gear mounted for rotation with said first sun gear, a second differential side gear mounted for rotation with said second sun gear, and differential pinions in meshing engagement with said first and second differential side gears to allow rotational speed differential between said first and second wheel hubs.

13. An apparatus as set forth in claim 12 wherein said first sun gear and said first differential side gear are integrally formed as one piece and said second sun gear and said second differential side gear are integrally formed as one piece.

14. A wheel end apparatus comprising:
   a spindle;
   an axle shaft mounted for rotation relative to said spindle and defining an axis of rotation;
   a first wheel hub supported for rotation about said axis;
   a second wheel hub positioned adjacent to said first wheel hub and supported for rotation about said axis;
   a first planetary gear assembly having a first sun gear and a first ring gear for driving said first wheel hub;
   a second planetary gear assembly having a second sun gear and a second ring gear for driving said second wheel hub; and
   a differential assembly coupled to said first and second sun gears to allow said first and second wheel hubs to rotate relative to one another under predetermined conditions.

15. An apparatus as set forth in claim 14 including a first planetary gear set having a first plurality of planet gears in meshing engagement with said first sun gear and said first ring gear and a second planetary gear set having a second plurality of planet gears in meshing engagement with said second sun gear and said second ring gear.

16. An apparatus as set forth in claim 14 including a first planetary gear set having a first plurality of planet gears in meshing engagement with said first sun gear, a second planetary gear set having a second plurality of planet gears in meshing engagement with said first ring gear and coupled to said first plurality of planet gears, a third planetary gear set having a third plurality of planet gears in meshing engagement with said second sun gear, and a fourth planetary gear set having a fourth plurality of planet gears in meshing engagement with said second ring gear and coupled to said third plurality of planet gears.

17. An apparatus as set forth in claim 14 wherein said differential assembly includes a first differential side gear mounted for rotation with said first sun gear, a second differential side gear mounted for rotation with said second sun gear, and differential pinions in meshing engagement with said first and second differential side gears to allow rotational speed differential between said first and second wheel hubs.

18. An apparatus as set forth in claim 17 including a differential spider driven by said axle shaft and supports said differential pinions for rotation.

19. An apparatus as set forth in claim 5 wherein each of said planet gears is mounted on a planet shaft fixed to said spindle.

20. An apparatus as set forth in claim 19 wherein each of said planet shaft supports one of said planet gears from said first planetary gear set and one of said planet gears from said second planetary gear set.

21. An apparatus as set forth in claim 19 wherein said planet gears do not rotate about said axis.

* * * * *

UNITED STATES PATENT AND TRADEMARK OFFICE
CERTIFICATE OF CORRECTION

PATENT NO. : 6,672,985 B2  Page 1 of 1
DATED : January 6, 2004
INVENTOR(S) : Chung et al.

It is certified that error appears in the above-identified patent and that said Letters Patent is hereby corrected as shown below:

Column 5,
Line 17, delete "ling" and please replace with -- ring --.

Signed and Sealed this

Fifteenth Day of June, 2004

JON W. DUDAS
*Acting Director of the United States Patent and Trademark Office*